(12) United States Patent
Sato et al.

(10) Patent No.: US 9,396,150 B2
(45) Date of Patent: Jul. 19, 2016

(54) COMPUTER SYSTEM AND METHOD UTILIZING A PCIE SWITCH TO CONTROL TRANSFER OF PACKETS

(75) Inventors: Kazuki Sato, Hadano (JP); Takashi Todaka, Hadano (JP); Ryo Takase, Ebina (JP)

(73) Assignee: HITACHI, LTD., Tokyo (JP)

( * ) Notice: Subject to any disclaimer, the term of this patent is extended or adjusted under 35 U.S.C. 154(b) by 436 days.

(21) Appl. No.: 13/989,999

(22) PCT Filed: Nov. 29, 2010

(86) PCT No.: PCT/JP2010/071250
§ 371 (c)(1),
(2), (4) Date: May 28, 2013

(87) PCT Pub. No.: WO2012/073304
PCT Pub. Date: Jun. 7, 2012

(65) Prior Publication Data
US 2013/0254453 A1 Sep. 26, 2013

(51) Int. Cl.
*G06F 13/40* (2006.01)
(52) U.S. Cl.
CPC .......... *G06F 13/4022* (2013.01); *G06F 13/404* (2013.01); *G06F 13/4027* (2013.01); *G06F 2213/0024* (2013.01); *G06F 2213/0026* (2013.01)
(58) Field of Classification Search
CPC ............ G06F 13/4022; G06F 13/4027; G06F 13/404; G06F 2213/0024; G06F 2213/0026
USPC ........................................................ 710/310
See application file for complete search history.

(56) References Cited

U.S. PATENT DOCUMENTS

| 7,752,376 | B1 | 7/2010 | Johnsen et al. | |
|---|---|---|---|---|
| 2003/0005207 | A1 | 1/2003 | Langendorf et al. | |
| 2008/0040526 | A1* | 2/2008 | Suzuki et al. | 710/302 |
| 2009/0150563 | A1 | 6/2009 | Piekarski | |
| 2009/0254692 | A1* | 10/2009 | Feehrer | 710/315 |
| 2014/0115219 | A1* | 4/2014 | Ajanovic et al. | 710/305 |

FOREIGN PATENT DOCUMENTS

| JP | 2004-531838 A | 10/2004 |
|---|---|---|
| JP | 2008-046722 A | 2/2008 |
| JP | 2009-282917 A | 12/2009 |
| WO | 2010/044409 A1 | 4/2010 |

* cited by examiner

*Primary Examiner* — Glenn A Auve
(74) *Attorney, Agent, or Firm* — Volpe and Koenig, P.C.

(57) ABSTRACT

A system and method are disclosed to prevent a reduction in the number of I/O devices which can be connected when building a PCIe topology by connecting I/O devices to a computer via a PCIe switch. A switch with which a computer and I/O devices are connected includes: a first PCI-PCI bridge which is positioned on the computer side; a second PCI-PCI bridge which is positioned on the I/O device side; trapper units which trap packet data which is inputted into the switch; a packet routing unit which transfers packet data to the I/O devices; and a management processor which is connected to the trapper units and provides the computer a virtual PCI-PCI bridge and a virtual link by execution of a program. The trapper units adjudicate the destination of the packet data which is transferred from the computer.

13 Claims, 12 Drawing Sheets

FIG. 7

| BUS NUMBER | VIRTUAL PCIe LINK |
|---|---|
| 0 | 250 |
| 1 | 260 |
| 2 | 270-1 |
| 3 | 280-1 |
| 4 | 290-1 |
| 5 | 290-2 |
| 6 | 290-3 |
| 7 | 270-2 |
| 8 | 280-2 |
| 9 | 290-4 |
| 10 | 290-5 |
| ... | ... |

COMPUTER SYSTEM AND METHOD UTILIZING A PCIE SWITCH TO CONTROL TRANSFER OF PACKETS

TECHNICAL FIELD

The present invention relates to a computer system and a switch and packet transfer control method used therein, especially relates to transfer control over packet data by PCIe switches in a computer system in which plural computers and plural I/O devices are connected using the PCIe switches.

BACKGROUND ART

PCI Express (hereinafter called PCIe) is one type of an extended bus used in a computer and prescribed by PCI Special Interest Group (PCI-SIG). PCIe adopts a serial transfer interface and full duplex. Data transfer according to the PCIe is performed substantially like the transmission and reception of packet data (hereinafter merely called a packet) in a network and a transmission line of a packet is called PCIe link.

The PCIe includes Root complex, Endpoint and a PCIe switch as a component. The Root complex is a function for linking a CPU and a PCIe link. The Root complex is generally built in an I/O controller in a computer. The Endpoint is a function at an end of the PCIe link. The Endpoint is generally built in an I/O device.

The PCIe switch has a function for increasing the number of PCIe links and relaying a packet and is configured by plural PCI-PCI bridges. The PCI-PCI bridge has a function for determining whether a received packet is to be passed or not. The PCIe switch and the I/O device are connected via the PCIe link by Root Complex in the computer. The topology of PCIe components connected to Root Complex is called PCIe topology.

PCI Manager (hereinafter called PCIM) performs the management and the control of PCIe topology such as the generation, the deletion and a change of the PCIe topology. Since PCIM is installed as software, it can also be executed in a computer; however, the PCIM is generally installed in a supervisor processor (SVP) from a viewpoint of security. The PCIM gives a number called a bus number to respective PCIe links which the PCIM recognizes. In the PCIe, each PCIe link is identified using its bus number.

Further, the PCIM reads a number called a device number given beforehand from each PCI-PCI bridge and each I/O device which the PCIM respectively recognizes. In the PCIe, each PCI-PCI bridge and each I/O device are identified using their device numbers. For example, when a packet is transmitted to a certain I/O device, the packet can be correctly transmitted to a device which is a destination of the packet by adding the information of a bus number of a PCIe link connected to the I/O device and a device number of the I/O device to the destination of the packet.

As for routing control between an I/O device and a server using a data switch, technique that the data switch is connected to a proxy controller, a packet is classified into a packet for data transfer and a packet for control and the packet for control is processed in the proxy controller is disclosed in Patent Literature 1 for example. Further, access from at least one server to a virtual I/O device is described.

In addition, in Patent Literature 2 for example, technique that a module acquired by integrating a sorter of a packet and a built-in processor respectively called a configuration entity is built in a PCIe switch, a packet is classified into a packet for data transfer and a packet for control and the packet for control is processed in the built-in processor is disclosed.

CITATION LIST

Patent Literature

Patent Literature 1: Publication of United States Patent No. 2009/0150563
Patent Literature 2: U.S. Pat. No. 7,752,376

SUMMARY OF INVENTION

Technical Problem

The PCIM recognizes a PCIe link connected to an I/O controller, a PCIe switch and an I/O device based upon PCIe topology. Therefore, correlation between the PCIe link and a bus number is uniquely determined in the PCIe topology.

For example, when multistage PCIe switches are connected to an I/O controller and an I/O device is connected to the PCIe switch at an end, multiple PCIe links each of which connects PCI-PCI bridges are required. Although the I/O device is not connected to the PCIe link, a bus number is given to the PCIe link by PCIM. In the meantime, in the specification of PCIe, the number of available bus numbers is limited to 256. Therefore, the number of bus numbers which can be given to the PCIe links for connecting the I/O device decreases. Accordingly, a problem occurs that the number of I/O devices which PCIM can recognize decreases. In Patent Literatures 1 and 2, no special measure to settle the above-mentioned problem is disclosed.

A first object of the present invention is to prevent the number of connectable I/O devices from decreasing when a computer and the I/O device are connected via a PCIe switch and PCIe topology is configured.

Further, in the PCIe switch using the technique disclosed in Patent Literature 2, the built-in processor processes input all packets for control. Therefore, a load is applied to the built-in processor and capability for processing the packets may be deteriorated.

A second object of the present invention is to reduce a load of a processor included in the PCIe switch and to prevent capability for processing packets from being deteriorated.

Solution to Problem

It is desirable that a computer system according to the present invention is configured as a computer system based upon a computer system where packet data is transferred via switches connected to a computer and an I/O device and having a characteristic that the switch is provided with a first PCI-PCI bridge arranged on the side of the computer, a second PCI-PCI bridge arranged on the side of the I/O device, a trapper unit that traps packet data input to the switch and a packet routing unit that transfers the packet data to the I/O device, the switch is further provided with a management processor which is connected to the trapper unit and which provides a virtual PCI-PCI bridge and a virtual link to the computer by the execution of a program, the trapper unit determines a destination of the packet data transferred from the computer, when the destination is the I/O device as a result of the determination, the trapper unit passes the packet data without trapping it and the packet data is transferred to the I/O device via the packet routing unit and the second PCI-PCI bridge, when the destination is the virtual PCI-PCI bridge as the result of the determination, the trapper unit traps the packet data and transmits it to the management processor, and the management processor transmits packet data for a response to the computer via the first PCI-PCI bridge according to the packet data.

According to the desirable example, the switch is a semiconductor switch provided with the management processor and a memory in the computer system, and the memory holds address space of the virtual PCI-PCI bridge.

Further, it is desirable that in the computer system, the operation of the management processor is executed by a processor with which the computer is provided.

In addition, it is desirable that in the computer system, the trapper unit is provided with a PCIe packet receiver that receives packet data transmitted from the computer, a comparing unit that stores a range of addresses which the PCI-PCI bridge uses, a bus number and a device number, compares them with a destination of the input packet data and judges whether the packet data is to be trapped or not, a buffer that temporarily stores the packet data transferred to the management processor, an input-output unit that transfers the packet data to the management processor, and a PCIe packet transmitter that transmits the packet data whose destination transferred from the management processor is an I/O controller.

Further, it is desirable that in the computer system, the computer can recognize the virtual PCIe topology provided by the management processor by a program operated by itself, the virtual PCIe topology includes a virtual PCI-PCI bridge as the PCI-PCI bridges that connect PCIe switches and a virtual PCIe link that connects the computer and the PCIe switch and connects the PCIe switch and the I/O device, the PCI-PCI bridge included in the physical configuration of the computer system is distinguished as a physical PCI-PCI bridge, address space of such a PCI-PCI bridge that its virtual PCI-PCI bridge and its physical PCI-PCI bridge can be correlated by one to one is realized in that of the physical PCI-PCI bridge, address space of a virtual PCI-PCI bridge that cannot be correlated with the corresponding physical PCI-PCI bridge by one to one is secured in the memory, and the management processor accesses the address space in the memory of the virtual PCI-PCI bridge, acquires a response from the memory if necessary, and transmits the response to the trapper unit.

Furthermore, it is desirable that in the computer system, a bus number given to the I/O device is changed by changing the correlation between the virtual PCI-PCI bridge and the physical PCI-PCI bridge.

It is desirable that the switch according to the present invention is configured as a PCIe switch based upon a PCIe switch which is connected to a computer and an I/O device and which transfers packet data and having a characteristic that the switch is provided with a first PCI-PCI bridge arranged on the side of the computer and a second PCI-PCI bridge arranged on the side of the I/O device, a trapper unit that traps packet data input to the switch, a packet routing unit that transfers the packet data to the I/O device, and a management processor which is connected to the trapper unit and which provides a virtual PCI-PCI bridge and a virtual link to the computer by the execution of a program, the trapper unit determines a destination of the packet data transferred from the computer, when the destination is the I/O device as a result of the determination, the trapper unit passes the packet data without trapping it and the packet data is transferred to the I/O device via the packet routing unit and the second PCI-PCI bridge, when the destination is the virtual PCI-PCI bridge as the result of the determination, the trapper unit traps the packet data and transmits it to the management processor, and the management processor transmits packet data for a response to the computer via the first PCI-PCI bridge according to the packet data.

Further, it is desirable that the switch is provided with a memory that holds address space of the virtual PCI-PCI bridge, and the management processor accesses the address space of the virtual PCI-PCI bridge in the memory, acquires a response from the memory if necessary, and transmits the response to the trapper unit.

In addition, it is desirable that in the PCIe switch, the trapper unit is provided with a PCIe packet receiver that receives packet data transmitted from the computer, a comparing unit that stores a range of addresses which the PCI-PCI bridge uses, a bus number and a device number, compares them with a destination of input packet data and judges whether the packet data is to be trapped or not, a buffer that temporarily stores packet data transferred between the buffer and the management processor, an input-output unit that transfers packet data from/to the management processor, and a PCIe packet transmitter that transmits packet data whose destination transferred from the management processor is an I/O controller.

Further, it is desirable that in the PCIe switch, virtual PCIe topology includes a virtual PCI-PCI bridge as a PCI-PCI bridge that connects PCIe switches and a virtual PCIe link that connects the computer and the PCIe switch and connects the PCIe switch and the I/O device, the PCI-PCI bridge included in the physical configuration of the computer system is distinguished as a physical PCI-PCI bridge, address space of such a PCI-PCI bridge that its virtual PCI-PCI bridge and its physical PCI-PCI bridge can be correlated by one to one is realized in that of the physical PCI-PCI bridge, and address space of a virtual PCI-PCI bridge that cannot be correlated with the corresponding physical PCI-PCI bridge by one to one is secured in the memory.

It is desirable that a packet transfer control method according to the present invention is based upon a packet transfer control method for controlling the transfer of packet data using PCIe switches connected to a computer and an I/O device and has a characteristic that a trapper module in a PCIe switch determines whether packet data is to be trapped or not, referring to a destination of the packet data input to the PCIe switch, in the case of packet data whose destination is a PCI-PCI bridge as a result of the determination, the trapper module traps the packet data and transfers it to a management processor, in the case of packet data whose destination is the I/O device as the result of the determination, the trapper module transfers the packet data to the I/O device without trapping it, the management processor accesses address space of the PCI-PCI bridge realized in a memory connected to the management processor when the management processor receives the packet data transferred from the trapper module, acquires a response from the memory if necessary, and transmits the response to the trapper module and the trapper module transmits the response acquired from the management processor to the computer.

Further, it is desirable that a packet transfer control method according to the present invention is based upon a packet transfer control method for controlling packet data using PCIe switches connected to a computer and an I/O device, and has a characteristic that the packet transfer control method is provided with preparing beforehand a virtual PCI-PCI bridge and virtual links in a memory connected to a management processor that manages PCI-PCI bridges, storing beforehand virtual PCI-PCI bridges and virtual links in the memory connected to the management processor that manages the PCI-PCI bridges, receiving packet data transferred from the computer via the first PCI-PCI bridge arranged on the side of the computer by the PCIe switch, determining a destination of the received packet data by the trapper unit of the PCIe switch, passing the packet data without trapping it by the trapper unit when the destination is the I/O device as a result of the determination and transferring the packet data to the I/O device via the second PCI-PCI bridge arranged on the side of the I/O device, trapping the packet data by the trapper unit when the destination is the virtual PCI-PCI bridge as the result of the determination and transmitting the packet data to the management processor connected to the trapper unit, and preparing packet data for a response referring to the memory by the management processor according to the packet data received from the trapper unit and transmitting the packet data for the response to the computer via the first PCI-PCI bridge.

Advantageous Effects of Invention

According to the present invention, when the multistage PCIe switches are connected to the computer, the I/O device is connected to the PCIe switch at the end and the PCIe topology is configured, the number of connectable I/O devices can be prevented from decreasing. Especially, access to virtual PCIe topology can be realized in PCIe topology having different physical configurations, and the virtual PCIe topology that does not depend upon physical connection can be realized. Hereby, PCIM can flexibly allocate a bus number to the PCIe link to which the I/O device is connected.

BRIEF DESCRIPTION OF DRAWINGS

FIG. 7 Correlation between a bus number and a virtual PCIe link in one embodiment.

DESCRIPTION OF EMBODIMENTS

Figure 1:
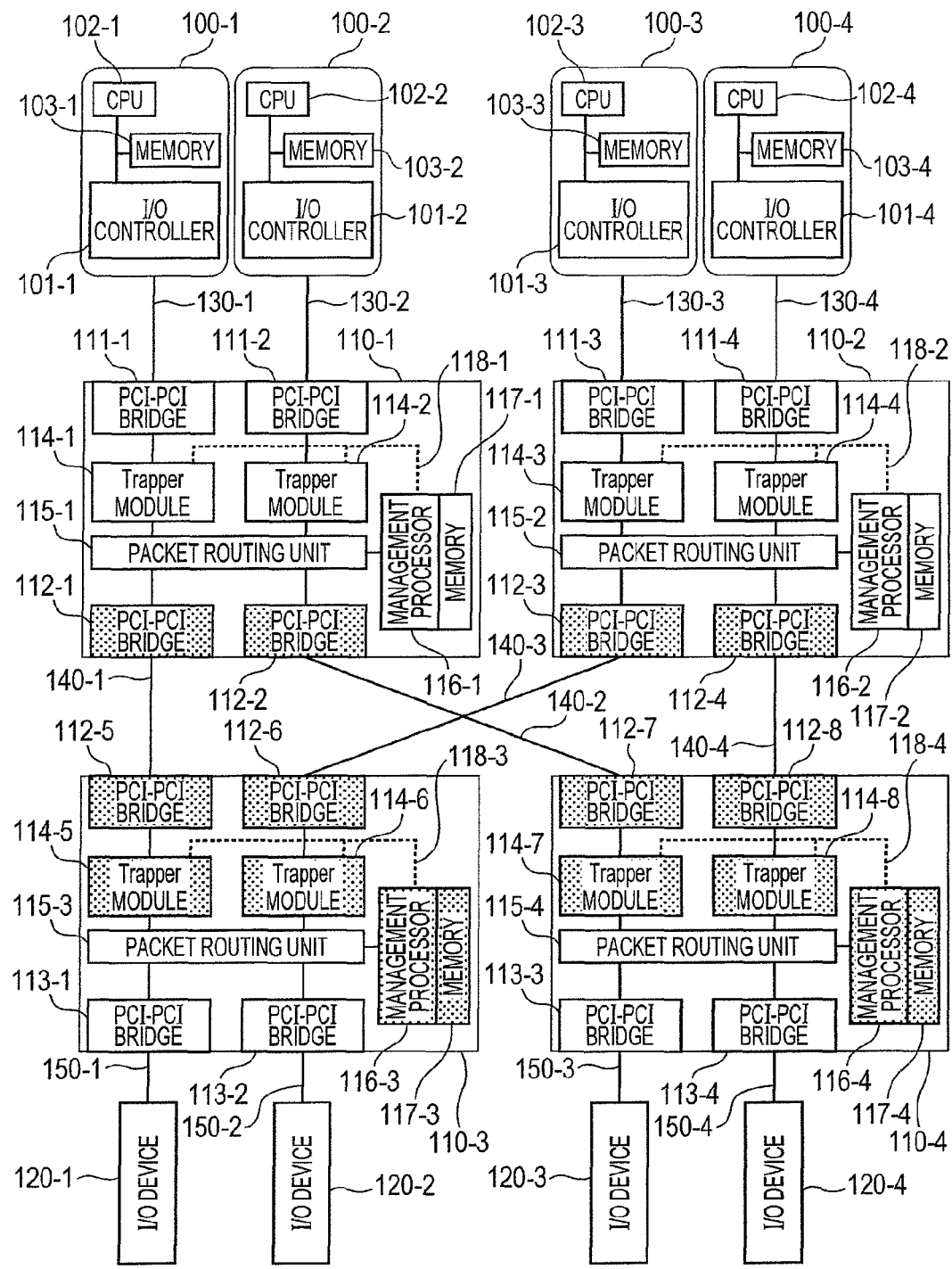
FIG. 1 The configuration of a computer system in one embodiment.

Referring to the drawings, an embodiment of the present invention will be described below.

FIG. 1 shows the configuration of a computer system in one embodiment.

This computer system includes plural computers 100-1 to 100-4 and plural I/O devices 120-1 to 120-4, and these are mutually connected via plural PCIe switches 110-1 to 110-4. As the PCIe switch is configured by a semiconductor integrated circuit (LSI), it may be called a PCIe switch LSI. (Plural computers, the plural I/O devices and the plural PCIe switches are merely shown as 100, 120, 110 unless they are especially distinguished. Reference numerals of the other components are also similar.) The computer 100 is provided with a processor (CPU) 102 that executes various data processing by the execution of a program, a memory 103 and an I/O controller 101 connected to the PCIe switch.

The PCIe switch 110 is configured by PCI-PCI bridges 111 and 112 or 112 and 113, trapper modules 114, a packet routing unit 115, a management processor 116 and a memory 117.

The trapper module 114 and the management processor 116 are connected via a particular bus 118 that does not comply with the specification of PCIe. The computer 100 and the PCIe switch 110 are connected via a PCIe link 130. The different PCIe switches 110 are connected via a PCIe link 140. The PCIe switch 110 and the I/O device 120 are connected via a PCIe link 150.

Figure 3:
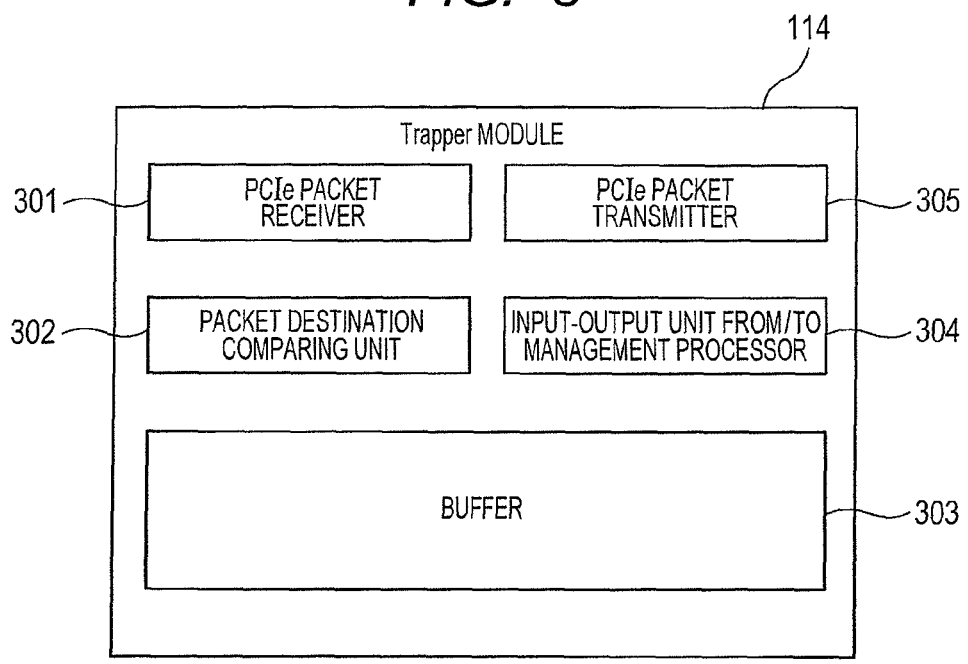
FIG. 3 The configuration of a trapper module in one embodiment.

Referring to FIG. 3, the configuration of the trapper module 114 will be described below.

The trapper module 114 has a configuration which is characteristic of the present invention and is provided with a processing function for judging whether a packet from the PCI-PCI bridge is to be trapped or not according to a destination of the packet. As shown in FIG. 3, the trapper module 114 is configured by a PCIe packet receiver 301, a packet destination comparing unit 302, a buffer 303, an input-output unit 304 from/to the management processor and a PCIe packet transmitter 305.

Figure 4:
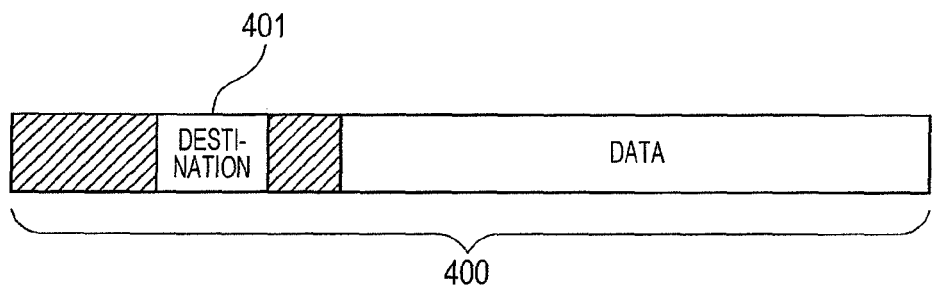
FIG. 4 A packet according to PCIe in one embodiment.

The PCIe packet receiver 301 has a function for receiving a packet from the I/O controller 101. The packet destination comparing unit 302 determines whether a destination of the received packet is the PCI-PCI bridge or not. As shown in FIG. 4, a destination 401 of a packet is included in a header of the PCIe packet 400. The packet destination comparing unit 302 judges whether the packet is to be trapped or not by referring to the destination 401 of the packet.

The destination 401 of the packet has two types of formats. The first type is the format in which a destination is specified by an address. The second type is the format in which a destination is specified by a bus number and a device number. The packet destination comparing unit 302 stores a range of addresses which the PCI-PCI bridge uses, bus numbers and device numbers, compares with the destination 401 of the input packet, and judges whether the packet is to be trapped or not. The range of addresses which the PCI-PCI bridge uses, the bus numbers and the device numbers are transferred to the trapper module 114 via the particular bus 118 from the management processor 116.

The trapper module 114 does not distinguish between a packet for data transfer and a packet for control and judges whether a packet is to be trapped or not depending upon a destination of the packet. Therefore, if a destination of a packet is the I/O device when the packet for control is received, the trapper module passes the packet without transferring the packet to the management processor. Therefore, the present invention can reduce a load of the management processor, compared with a case that all packets for control are transferred to the management processor. In addition, capability for processing a packet can be prevented from being deteriorated.

The buffer 303 temporarily stores a packet so as to transfer the packet between the trapper module 114 and the management processor 116 described later. The input-output unit 304 from/to the management processor is connected to the management processor 116 and transfers a packet via the particular bus. The PCIe packet transmitter 305 transmits a packet for a response whose destination transferred from the management processor is the I/O controller 101.

The trapper module 114 can trap a packet whose destination is a PCI-PCI bridge that does not physically exist because the trapper module exists between PCI-PCI bridges 111-1 to 111-4 which are connected to the I/O controller 101 and the packet routing unit 115-1 or 115-2 as shown in FIG. 1.

In this embodiment, a routing control mechanism of a packet in the computer system is configured by combining plural pieces of the same PCIe switches 110. Each function of the trapper module 114 is made effective when the PCIe switch 110 is connected to the I/O controller 101. Accordingly, in the trapper modules 114-1 to 114-4 included in the PCIe switches 110-1, 110-2, their functions effectively act and routing control using the management processor is performed.

In the meantime, in the trapper modules 114-5 to 114-8 in the PCIe switches 110-3, 110-4 which are not connected to the I/O controller 101, the function of the trapper module 114 is nullified and all packets are passed. That is, since no function of the trapper module 114 acts (is necessary), routing control without the aid of the management processor is applied to all packets.

The PCIe link performs communication in full duplex in which a signal line for transmission and a signal line for reception are separated. Therefore, each signal line connected to the trapper modules 114-1 to 114-4 is classified into a signal line connected to the PCI-PCI bridge 111 and a signal line connected to the packet routing unit 115. The trapper module 114 applies the function of the trapper module 114 to a signal input from the PCI-PCI bridge 111. Therefore, each function of the trapper module 114 is applied to a packet input from the PCI-PCI bridge 111. Each function of the trapper module 114 is not applied to a signal input from the packet routing unit 115. Therefore, a packet input from the packet routing unit 115 passes the PCI-PCI bridge 111.

In the present invention, the trapper module 114 and the management processor 116 are not integrated and are different modules. Therefore, the concentrated input of packets to one trapper module 114 is avoided by arranging the plural trapper modules 114 and the packets can be transferred to the management processor 116 at high speed.

Figure 5:
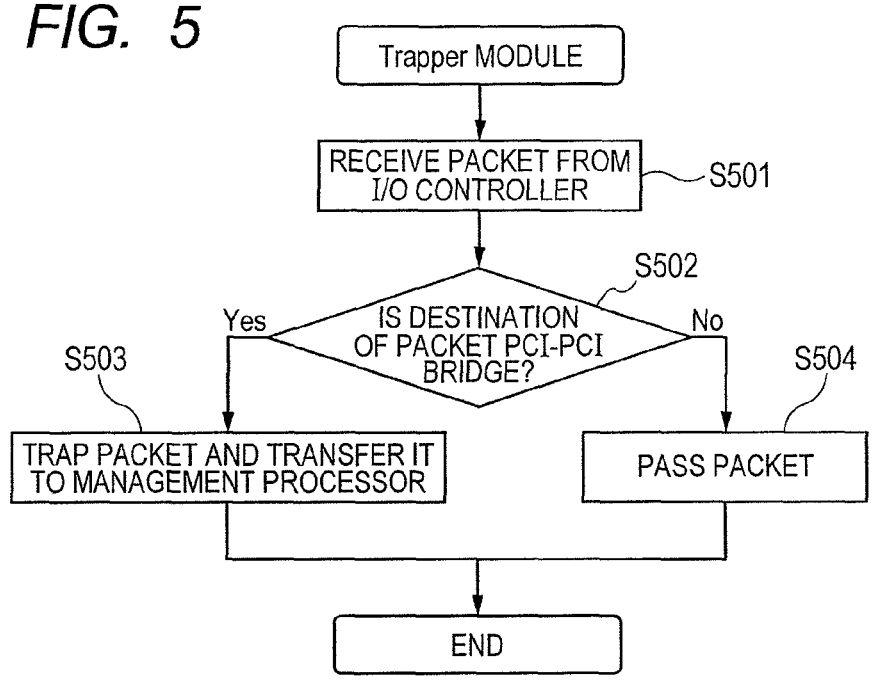
FIG. 5 A flowchart showing the operation of the trapper module in one embodiment.

FIG. 5 is a flowchart showing the operation of the trapper module 114.

This process is executed when the trapper module 114 receives a packet from the I/O controller 101 (S501). It is determined whether a destination 401 of the received packet is the PCI-PCI bridge or not (S502). In the case of Yes (that is, in a case that the destination is the PCI-PCI bridge) as a result of the determination, processing proceeds to S503 and in the case of No (in a case that the destination is not the PCI-PCI bridge), the processing proceeds to S504.

In the step S503, the trapper module 114 traps the received packet and transfers it to the management processor 116. Processing in a case that the packet is transferred to the management processor 116 will be described later referring to FIG. 8.

Further, in the step S504, the trapper module 114 passes the received packet without changing the destination. In this case, the packet is transferred to an address included in the destination 401 or to any I/O device 120 specified by a bus number and a device number.

When either processing in S503 or S504 is completed, the trapper module 114 finishes the operation.

Referring to FIG. 1 again, the packet routing unit 115 is connected to the trapper module 114, the management processor 116 and the PCI-PCI bridge 112 or 113 and has a function for transferring the input packet to its destination. The packet routing unit is not required to depend upon the specification of PCIe and if only the packet reaches the destination, a type of routing does not come into question.

The management processor 116 is a processor that operates firmware which manages the PCI-PCI bridge. The operation of the firmware will be described later. Further, the memory 117 is connected to the management processor 116. The functions of the management processor 116 and the memory 117 are validated when the PCIe switch 110 is connected to the I/O controller 101 like the trapper module 114. Corresponding to it, the functions of the management processors 116-1, 116-2 are validated and in the meantime, the functions of the management processors 116-3, 116-4 are nullified.

Also for the memory 117, the functions of the memories 117-1, 117-2 are validated and the functions of the memories 117-3, 117-4 are nullified.

In this embodiment, the management processor 116 and the memory 117 are mounted in the PCIe switch 110; however, the present invention is not limited to this. For example, the management processor 116 or the memory 117 or both may also be arranged outside the PCIe switch 110.

Further, in this embodiment, the management processor 116 is built in the PCIe switch 110; however, the present invention is not limited to this, and in place of the management processor 116, the CPU 102 included in the computer 100 may also be used. Similarly, in place of the memory 117, the memory 103 included in the computer 100 may also be used.

Figure 2:
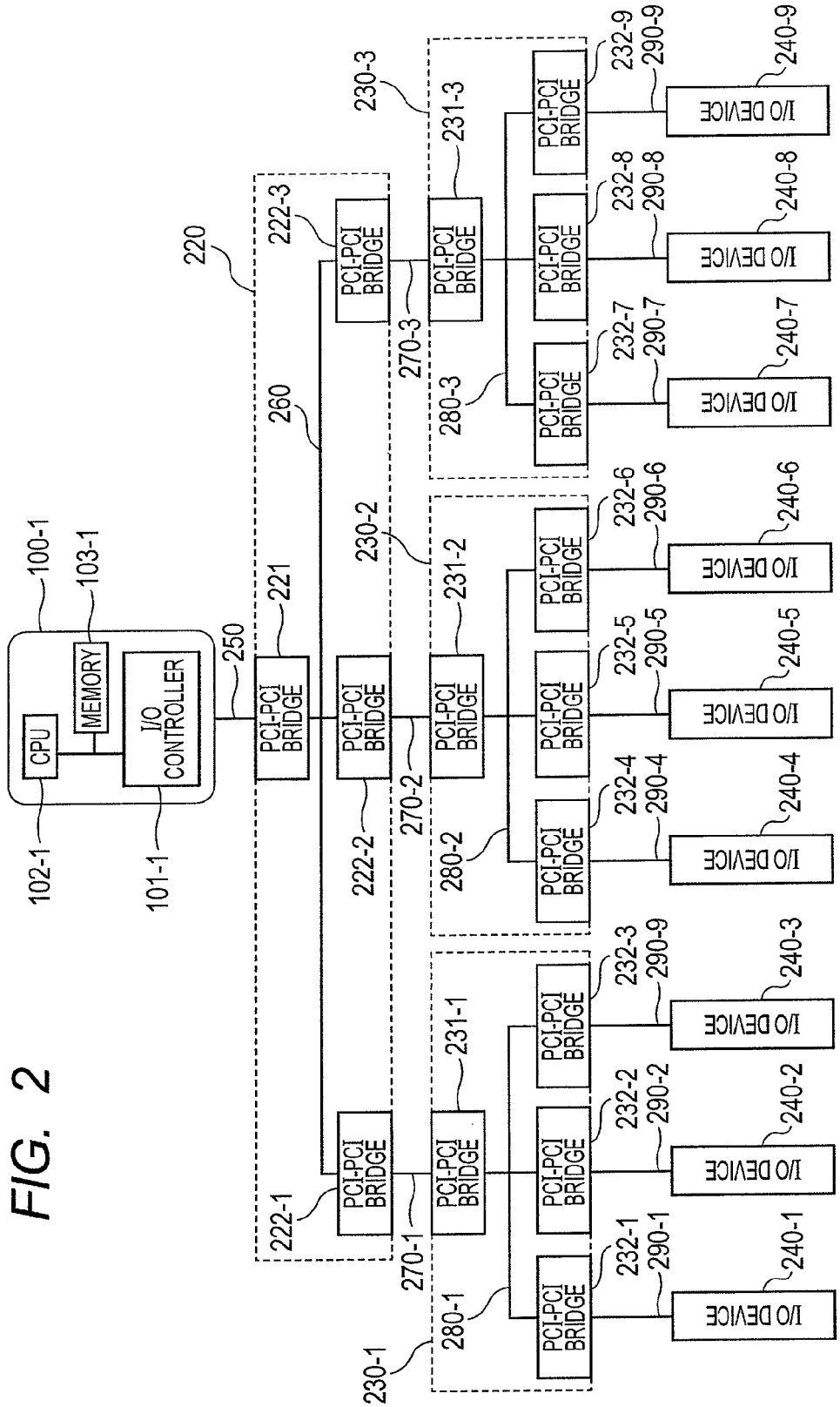
FIG. 2 The configuration of virtual PCIe topology in one embodiment.

FIG. 2 shows PCIe topology which a program operated in the computer 100-1 for example recognizes. Programs operated in the computers 100-2 to 100-4 can also be similarly recognized. As PCIe topology is logical unlike a physical configuration, it is called virtual PCIe topology in this case.

The virtual PCIe topology is PCIe topology which the program operated in the computer 100 recognizes. The program operated in the computer 100 recognizes the virtual PCIe topology by searching the PCIe link, the PCI-PCI bridge and the I/O device.

PCI-PCI bridges 221, 222, 231, 232 included in the virtual PCIe topology shall be called a virtual PCI-PCI bridge below. Further, PCIe switches 220, 230 shall be called virtual PCIe switch. Further, PCIe links 250, 260, 270, 280, 290 shall be called virtual PCIe link.

The virtual PCIe switch 220 is connected to the computer 100-1 via the virtual PCIe link 250. Further, plural virtual PCIe switches 230 are connected to the virtual PCIe switch 220 via the virtual PCIe link 270. Further, the plural I/O devices 240 are connected to the virtual PCIe switches 230 via the virtual PCIe link 290.

In FIG. 2, the PCIe switches 220, 230 are connected to the I/O controller 101-1 with two stages overlapped in each PCIe switch; however, the present invention is not limited to this. For example, the PCIe switch may also be configured by one stage or three or more stages. A user can arbitrarily determine the virtual PCIe topology based upon the number of the computer 100 and the I/O device 120. Accordingly, it can be said that there is no dependence between the number of the PCIe switches shown in FIG. 1 and the number of the virtual PCIe switches shown in FIG. 2. In the specification of PCIe, since the maximum number of available bus numbers connected to one computer is 256, the maximum number of the PCI-PCI bridges (that is, the PCIe switches 220) connected to the computer 100-1 is 8 and the number of the PCI-PCI bridges connected to the PCIe switch 220 is 32 when the example shown in FIG. 2 is extended.

To distinguish from the virtual PCI-PCI bridge, the PCI-PCI bridge included in the physical configuration of the computer system shown in FIG. 1 will be called the physical PCI-PCI bridge below.

Address space of the virtual PCI-PCI bridge can also be all realized in the memory 117. However, when the address space of all the virtual PCI-PCI bridges is realized in the memory 117, the capacity of the memory 117 increases. Further, in this case, since the management processor 116 performs all the processing of the virtual PCI-PCI bridges, a load of the management processor 116 increases.

For the above-mentioned reason, in this embodiment, it is desirable that when the virtual PCI-PCI bridge and the physical PCI-PCI bridge can be correlated by one to one, the correlation is utilized. Hereby, the address space of the correlatable PCI-PCI bridges is realized in an address of the physical PCI-PCI bridge. In the meantime, address space of the virtual PCI-PCI bridge which is not correlated is realized in the memory 117. When virtual PCIe topology and the physical configuration of the computer system shown in FIG. 1 are determined, the following correlation can be determined.

The virtual PCI-PCI bridges shown in FIG. 2 can be classified into the following three types. The first type is the virtual PCI-PCI bridge 221 connected to an I/O controller 101-1, the second type is the virtual PCI-PCI bridge 232 connected to the I/O device 240 in the virtual PCIe topology, and the third type is the virtual PCI-PCI bridges 222, 231 that connect the virtual PCIe switches 220, 230.

The physical PCI-PCI bridges included in the computer system shown in FIG. 1 can be classified into the following three types. The first type is the physical PCI-PCI bridge 111 connected to the I/O controller 101, the second type is the physical PCI-PCI bridge 113 connected to the I/O device 120 in the physical configuration, and the third type is the physical PCI-PCI bridge 112 that connects the PCIe switches 110-1, 110-2 and the PCIe switches 110-3, 110-4.

For example, when the computer 100-1 recognizes the I/O devices 120-1, 120-4 in the physical configuration, the virtual PCI-PCI bridge 221 and the physical PCI-PCI bridge 111-1 are correlated. Further, the virtual PCI-PCI bridge 232-1 and the physical PCI-PCI bridge 113-1 are correlated. Further, the virtual PCI-PCI bridge 232-2 and the physical PCI-PCI bridge 113-4 are correlated. In this case, the virtual PCI-PCI bridges 222, 231 are not correlated with the physical PCI-PCI bridge. Furthermore, as for the physical PCI-PCI bridge 112 that connects the different PCIe switches 110, a function as the PCI-PCI bridge for judging whether a packet can be passed or not is nullified and all packets are passed.

When the virtual PCI-PCI bridge and the physical PCI-PCI bridge are correlated, the I/O devices are also correlated by one to one. In the case of the above-mentioned example, the I/O device 240-1 in the virtual PCIe topology and the I/O device 120-1 in the physical configuration are correlated. Further, the I/O device 240-2 in the virtual PCIe topology and the I/O device 120-4 in the physical configuration are correlated.

Figure 6:
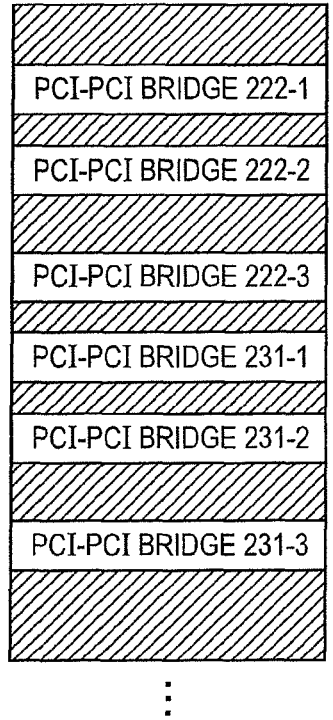
FIG. 6 A block diagram showing address space in a memory in one embodiment.

As described above, it is known that the address space of the virtual PCI-PCI bridge 221 is realized in the physical PCI-PCI bridge 111. Further, the address space of the virtual PCI-PCI bridge 232 is realized in the physical PCI-PCI bridge 113. The address space of the virtual PCI-PCI bridges 222, 231 is realized in the memory 117 as shown in FIG. 6. That is, using the example shown in FIG. 2, the address space of the virtual PCI-PCI bridges 222-1, 222-2, 222-3, 231-1, 231-2, 231-3 is secured in the memory 117.

When PCIM recognizes the virtual PCIe topology shown in FIG. 2, the PCIM gives the virtual PCIe link a bus number as follows.

First, the device connected to the I/O controller 101 is searched. Then, the PCIM recognizes that the virtual PCI-PCI bridge 221 is connected to the I/O controller 101. Hereby, the PCIM gives a bus number 0 to the PCIe link 250 that connects the I/O controller 101 and the virtual PCI-PCI bridge 221 (see FIG. 7).

Next, the device connected to the virtual PCI-PCI bridge 221 is searched. Then, the PCIM recognizes that the virtual PCI-PCI bridges 222-1, 222-2, 222-3 are connected to the virtual PCI-PCI bridge 221. Hereby, the PCIM gives a bus number 1 to the PCIe link 260 that connects the virtual PCI-PCI bridge 221 and the virtual PCI-PCI bridge 22.

Next, the device connected to the virtual PCI-PCI bridge 222-1 is searched. Then, the PCIM recognizes that the virtual PCI-PCI bridge 231-1 is connected to the virtual PCI-PCI bridge 222-1. Hereby, the PCIM gives a bus number 2 to the PCIe link 270-1 that connects the virtual PCI-PCI bridge 222-1 and the virtual PCI-PCI bridge 231-1.

Correlation between the bus numbers and the virtual PCIe links when the PCIM continues the above-mentioned operation is shown in FIG. 7. Therefore, in the example in this embodiment, since the virtual PCIe link 290-1 is connected to the I/O device 120-1 in the physical configuration, a bus number 4 is given to the link. Further, since the virtual PCIe link 290-2 is connected to the I/O device 120-4 in the physical configuration, a bus number 5 is given to the link.

A bus number given to the I/O device changes by changing correlation between the virtual PCI-PCI bridge and the physical PCI-PCI bridge. For example, since the virtual PCIe link 290-4 is connected to the I/O device 120-4 in the physical configuration when the virtual PCI-PCI bridge 232-4 and the physical PCI-PCI bridge 113-4 are correlated, a bus number 9 is given to the link. As described above, the bus numbers can be flexibly allocated to the I/O devices.

Figure 8:
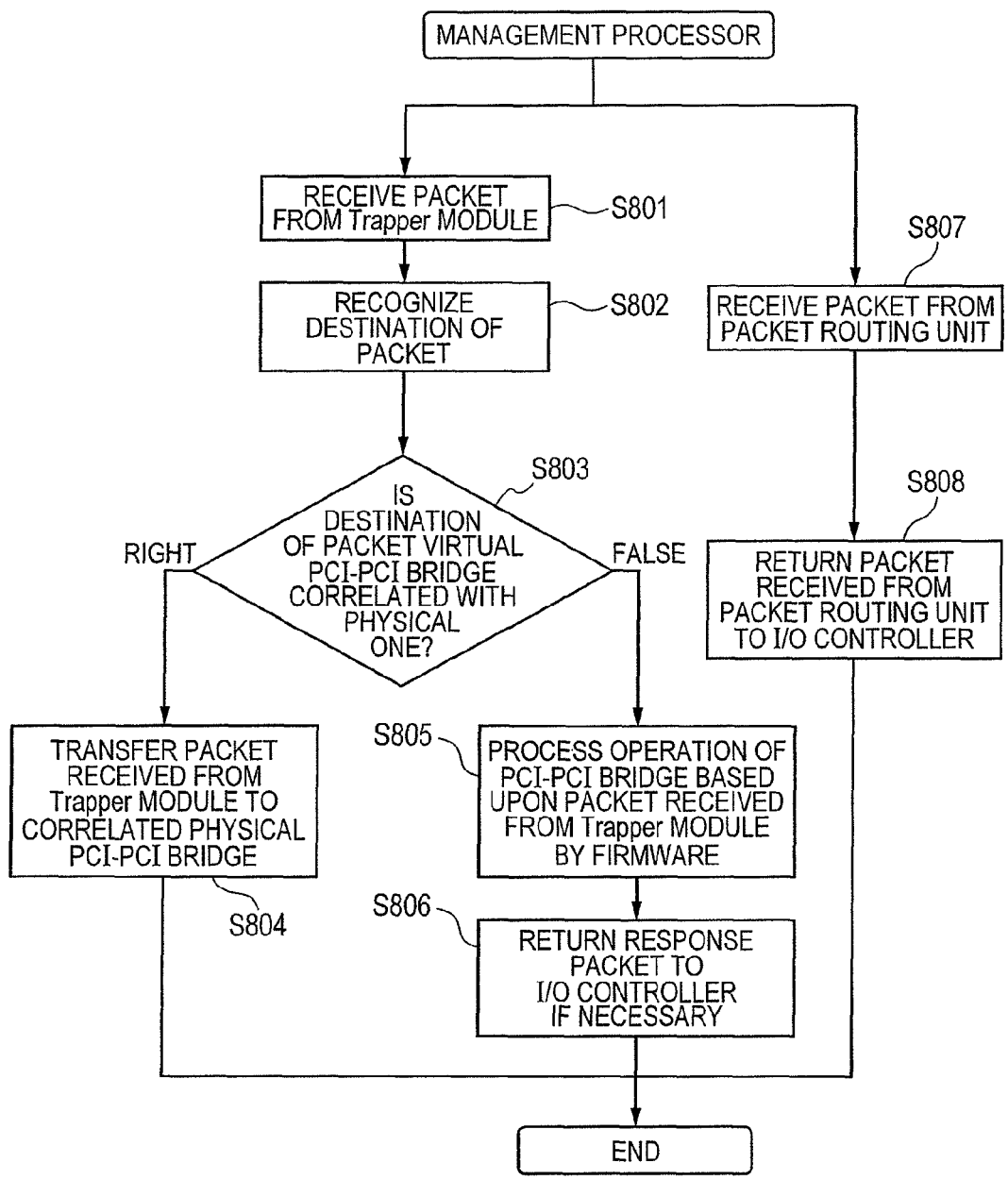
FIG. 8 A flowchart showing a process of firmware operated in a management processor in one embodiment.

Next, the processing of the firmware operated in the management processor 116 will be described, referring to FIG. 8. The processing of the firmware is executed when the management processor 116 receives a packet from the trapper module 114 (S801) or receives a packet from the packet routing unit 115 (S807).

First, a destination of a packet received from the trapper module 114 is recognized (S802). As a result, it is determined whether or not the destination of the packet is the virtual PCI-PCI bridge correlated with the physical PCI-PCI bridge (S803). When a result of the determination is right (Yes), processing proceeds to S804 and when a result of the determination is false (No), the processing proceeds to S805.

In S804, a packet received from the trapper module 114 is transferred to the correlated physical PCI-PCI bridge. In the meantime, in S805, the firmware accesses the address space realized in the memory 117 of the virtual PCI-PCI bridge based upon a packet received from the trapper module. As a result of the processing in the firmware, when a response is required to be returned to the I/O controller, a response packet is generated and returned to the I/O controller 101 via the trapper module 114 (S806).

Further, when a packet is received from the packet routing unit (S807), the received packet is returned to the I/O controller 101 via the trapper module 114 (S808).

The PCIe topology recognized by a program operated in the computer system shown in FIG. 1 is the virtual PCIe topology shown in FIG. 2. Therefore, access from the I/O controller 101 to the virtual PCI-PCI bridges 221, 222, 231, 232 occurs. A flow of processing executed by the PCIe switch 110 when a packet of the access is input to the PCIe switch 110 shown in FIG. 1 will be described referring to FIGS. 9 and 10 below.

In this case, a case that the access to the virtual PCI-PCI bridges 221, 222, 231, 232 occurs means a case that the contents (for example, identification information of the PCI-PCI bridge) with which the PCI-PCI bridge is provided of the memory is read according to an instruction from the computer 100 or a case that a parameter of the PCI-PCI bridge is initialized (written) or a case that a parameter set in the PCI-PCI bridge is released for example.

Figure 9:
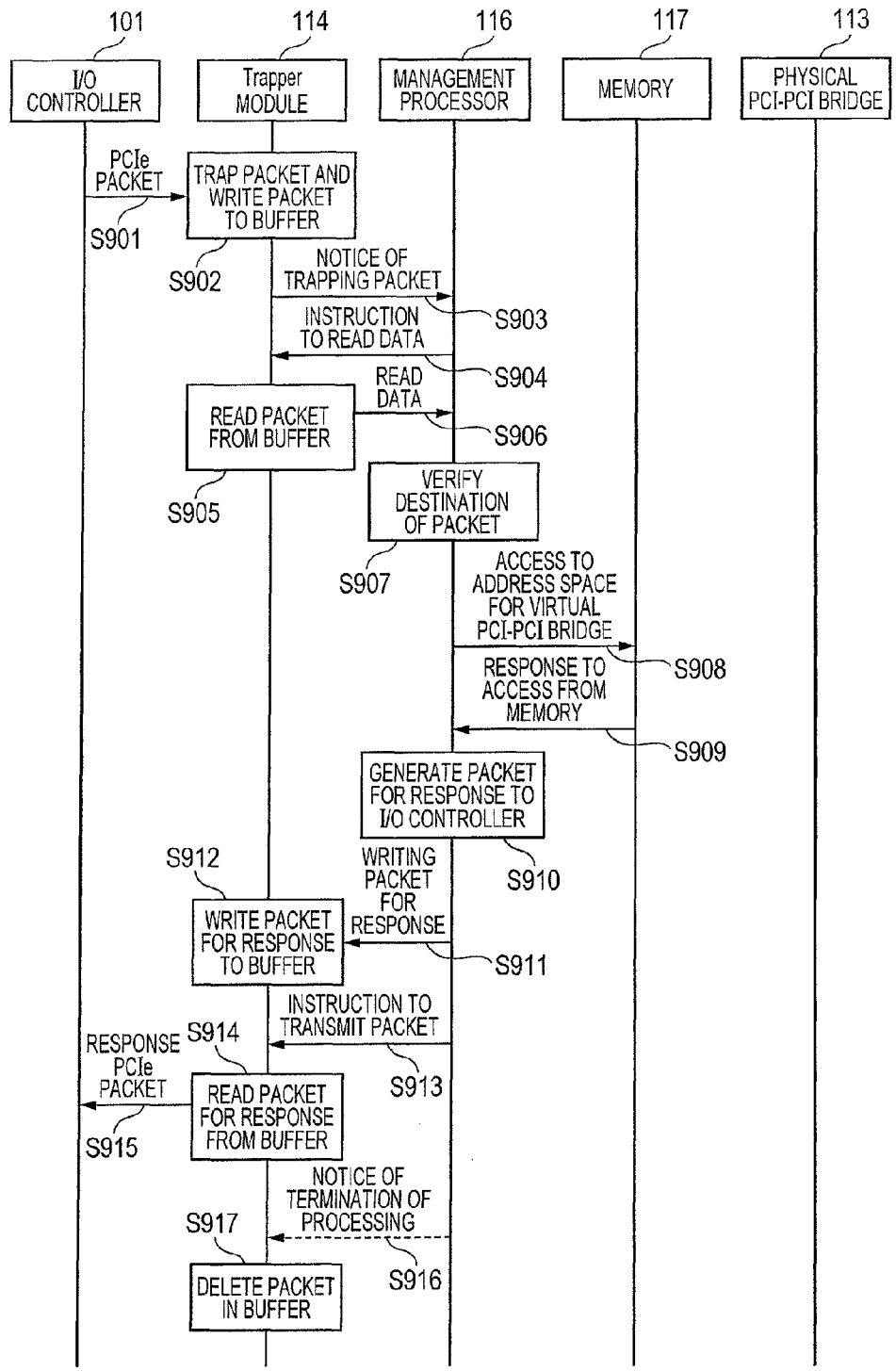
FIG. 9 A flowchart showing a process when access from an I/O controller to a virtual PCI-PCI bridge occurs in one embodiment.

FIG. 9 shows a flow of processing executed by the PCIe switch 110 when access from the I/O controller 101 to the virtual PCI-PCI bridges 222, 231 occurs in the virtual PCIe topology shown in FIG. 2.

When a packet is transmitted from the I/O controller 101 to the PCI-PCI bridge (S901), the trapper module 114 traps the packet and sequentially writes it in the buffer 303 in the trapper module 114 (S902). When the trapper module 114 finishes writing the trapped packet to the buffer 303, the trapper module notifies the management processor 116 of trapping the packet (S903).

When the management processor 116 receives the notice of trapping the packet, it transmits an instruction to read data in the buffer 303 to the trapper module 114 (S904). Then, the trapper module 114 reads the data of the packet from the buffer 303 (S905) and transmits the read data to the management processor 116 (S906).

When the management processor 116 receives the data of the packet, it recognizes a destination of the packet (907). As a result, when the management processor recognizes that the destination of the packet is the virtual PCI-PCI bridges 222, 231 (S907), the management processor 116 accesses address space for the virtual PCI-PCI bridges in the memory 117 (S908).

Generally, no response is made to access to the memory in writing processing and a response including read data is made in reading processing. Therefore, when the contents of a packet to the virtual PCI-PCI bridge are writing processing, no response is made from the memory 117 to the management processor 116. When the contents of a packet to the virtual PCI-PCI bridge are reading processing, the management processor 116 receives a response from the memory 117 (S909).

When access from the I/O controller 101 is reading from memory space and access to configuration space that respectively require a packet for a response, the management processor 116 generates the packet for the response to the I/O controller 101 (S910). The management processor 116 transmits the generated packet for the response to the trapper module 114 (S911).

The trapper module 114 sequentially writes the packet for the response received from the management processor 116 to the buffer 303 in the trapper module 114 (S912).

When the management processor 116 transmits all packets for responses to the trapper module 114, it transmits an instruction to transmit the packets for responses to the I/O controller 101 to the trapper module 114 (S913). Then, the trapper module 114 reads the packets for responses from the buffer 303 (S914) and transmits the packets for responses to the I/O controller 101 (S915).

When access from the I/O controller 101 such as writing to memory space requires no packet for a response, the management processor 116 notifies the trapper module 114 of the termination of processing (S916).

When the transmission of the packets for responses to the I/O controller 101 is completed or when the notice of the termination of processing from the management processor 116 is received, the trapper module 114 deletes all the packets in the buffer 303 (S917).

As a result, the processing of the computer system for the access from the I/O controller 101 to the virtual PCI-PCI bridges 222, 231 is finished.

Figure 10:
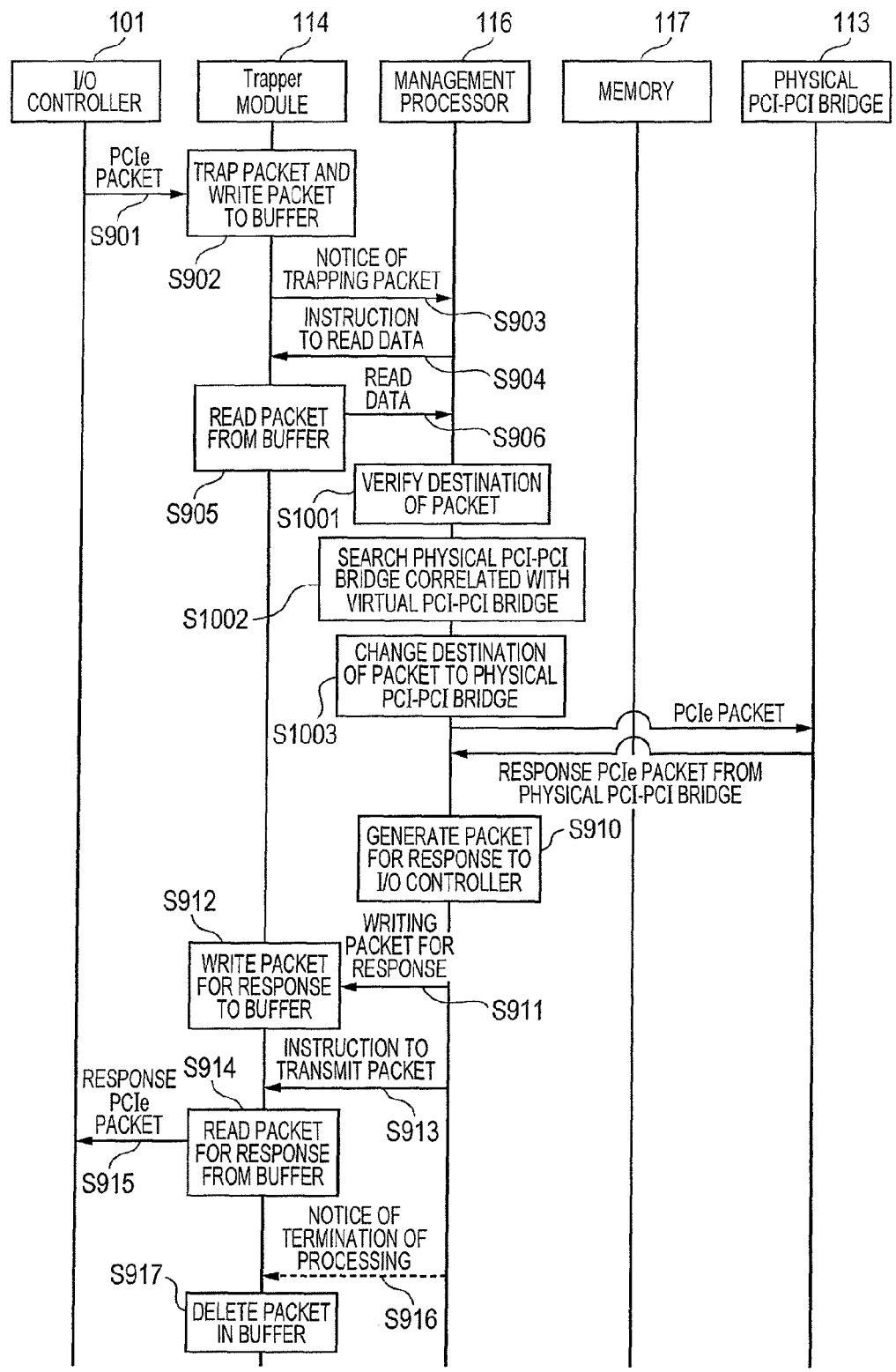
FIG. 10 A flowchart showing the process when the access from the I/O controller to the virtual PCI-PCI bridge occurs in one embodiment.

FIG. 10 shows a flow of processing executed by the PCIe switch 110 when access from the I/O controller 101 to the virtual PCI-PCI bridge 232 occurs in the virtual PCIe topology shown in FIG. 2. Operation from S901 to S906 is the same as the processing shown in FIG. 9.

When the management processor 116 recognizes that a destination of a packet is the virtual PCI-PCI bridge 232 (S1001), it searches the correlated physical PCI-PCI bridge (S1002). The management processor changes the destination of the packet to the searched physical PCI-PCI bridge 113 (S1003) and transfers the packet to the physical PCI-PCI bridge 113 (S1004).

When the access from the I/O controller 101 is reading from memory space and access to configuration space that respectively require a packet for a response, the management processor 116 receives the packet for the response from the physical PCI-PCI bridge 113 (S1005).

Afterward, operation from S910 to S917 is the same as that in the process shown in FIG. 9. As a result, the processing of the computer system for the access from the I/O controller 101 to the virtual PCI-PCI bridge 232 is finished.

Next, a concrete example of routing control in transmitting a packet in the computer system shown in FIG. 1 when access from the I/O controller 101 to the virtual PCI-PCI bridges 221, 222, 231, 232 or to the I/O device 120 in the physical configuration occurs in the virtual PCIe topology shown in FIG. 2 will be described.

Figure 11:
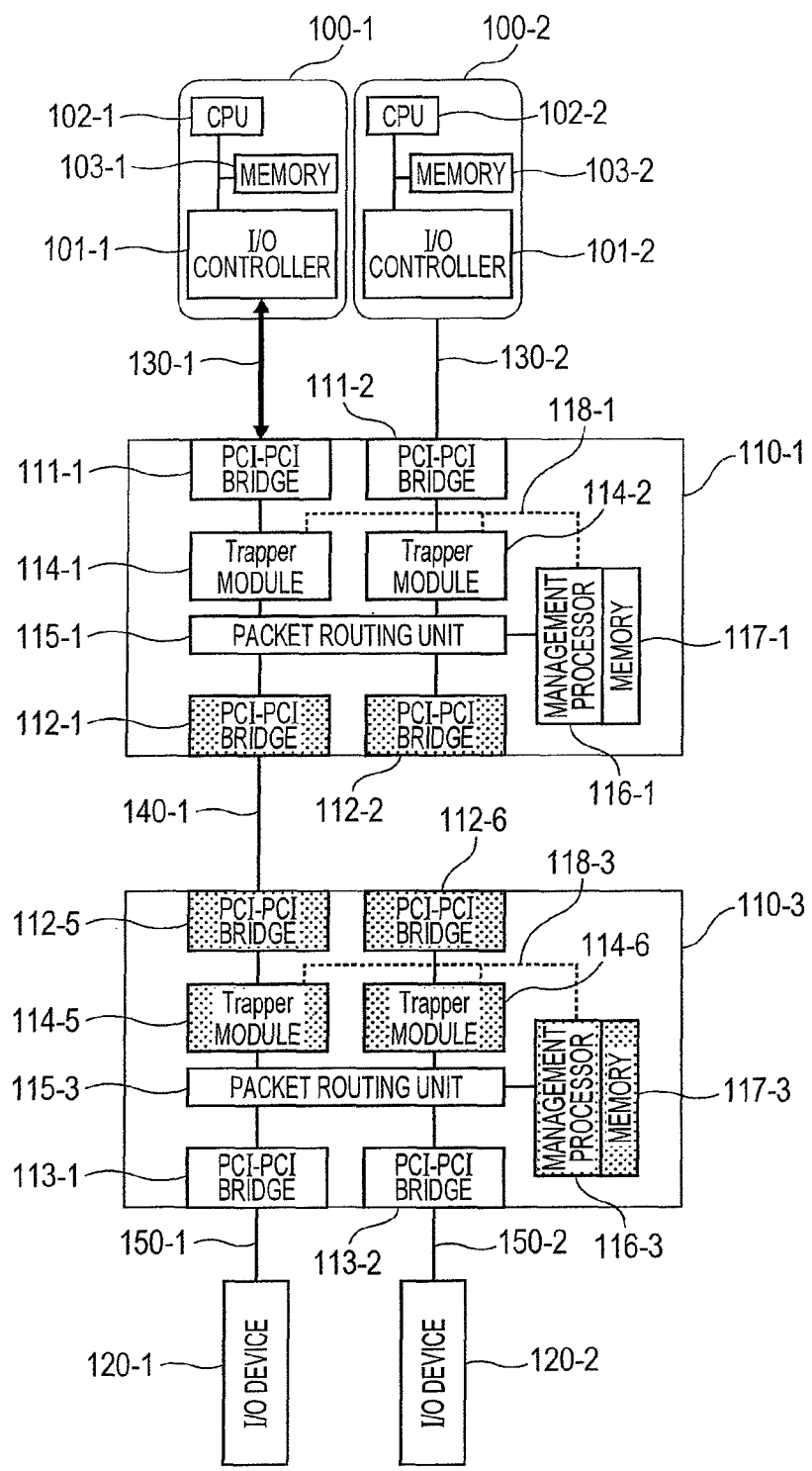
FIG. 11 A flow of a packet when access from the I/O controller to the virtual PCI-PCI bridge occurs in one embodiment.

FIG. 11 shows a flow of a packet in the computer system when access from the I/O controller 101-1 to the virtual PCI-PCI bridge 221 occurs in the virtual PCIe topology shown in FIG. 2.

In this case, before the packet reaches the trapper module 114-1, the packet reaches the correlated physical PCI-PCI bridge 111-1. Therefore, direct access is made from the I/O controller 101-1 to the physical PCI-PCI bridge 111-1 correlated with the virtual PCI-PCI bridge 221.

Figure 12:
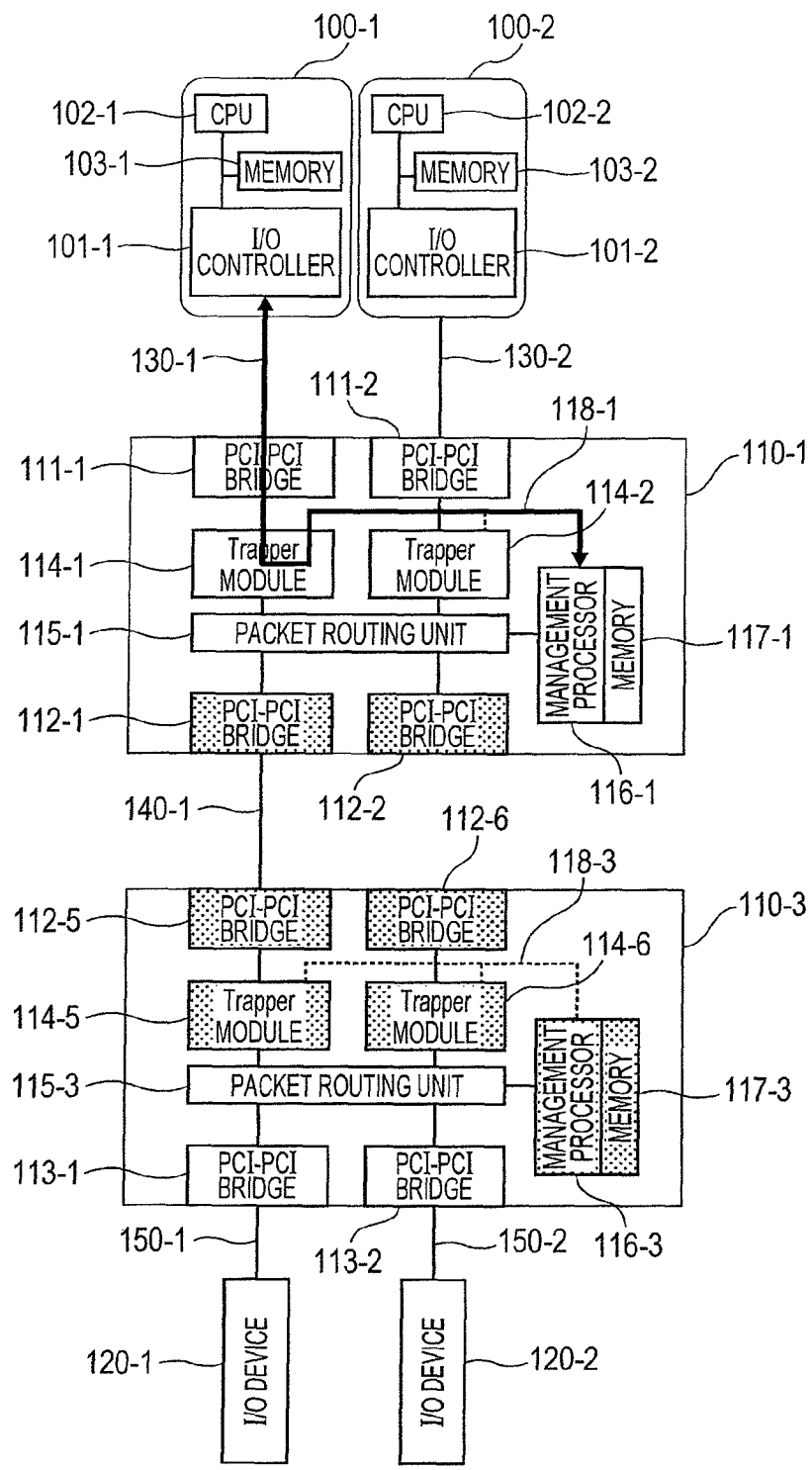
FIG. 12 A flow of a packet when the access from the I/O controller to the virtual PCI-PCI bridge occurs in one embodiment.

FIG. 12 shows a flow of a packet in the computer system when access from the I/O controller 101-1 to the virtual PCI-PCI bridges 222, 231 occurs in the virtual PCIe topology shown in FIG. 2.

In this case, the trapper module 114-1 which is the closest to the I/O controller 101-1 traps the packet and transfers the packet to the management processor 116-1 using a dedicated bus. When the management processor 116-1 receives the packet, it performs the process shown in FIG. 9 using firmware. The management processor 116-1 generates a packet for a response to the I/O controller 101-1 and returns the packet for the response via the trapper module 114-1.

Figure 13:
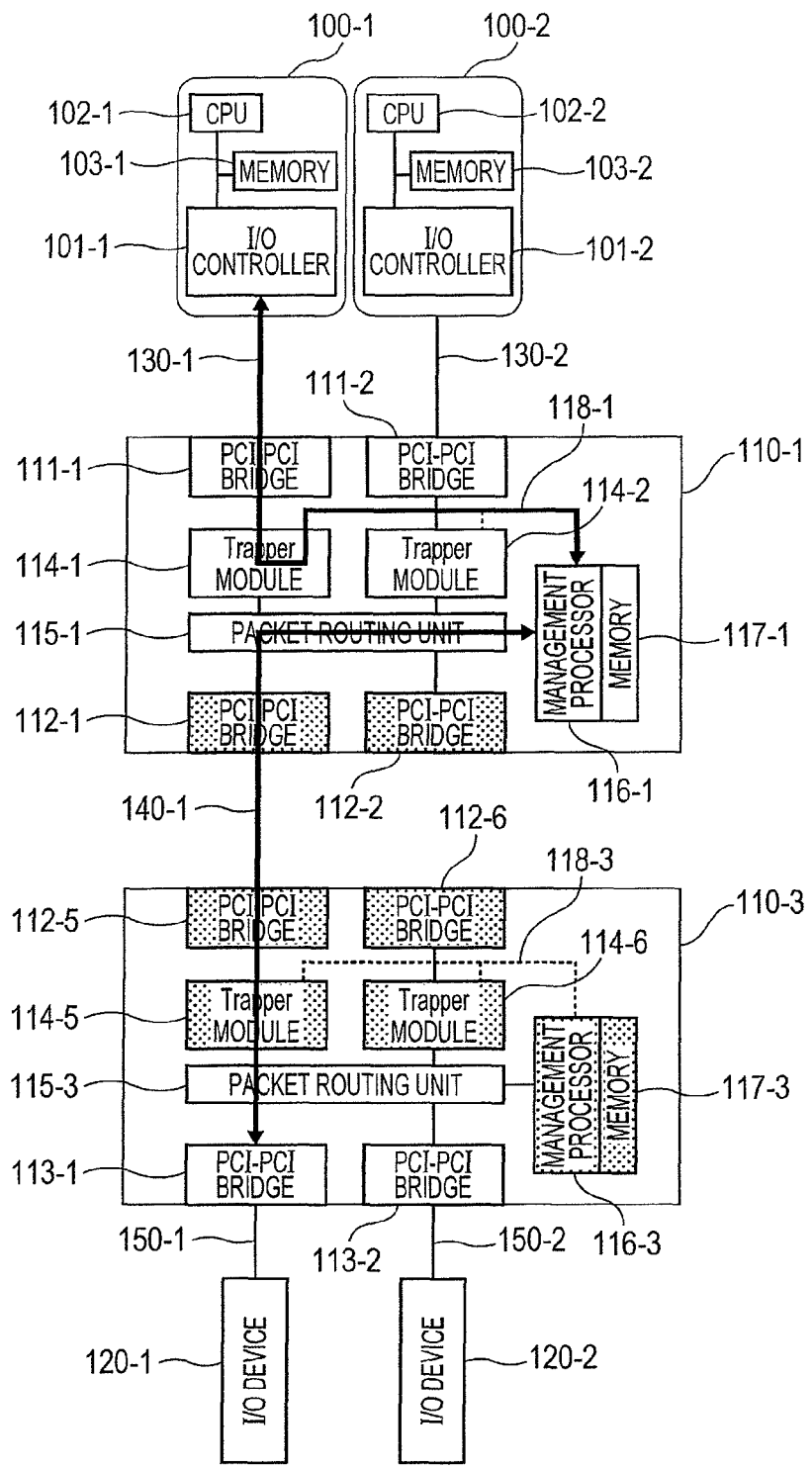
FIG. 13 A flow of a packet when the access from the I/O controller to the virtual PCI-PCI bridge occurs in one embodiment.

FIG. 13 shows a flow of a packet in the computer system when access from the I/O controller 101-1 to the virtual PCI-PCI bridge 232-1 occurs in the virtual PCIe topology shown in FIG. 2.

In this case, the trapper module 114-1 which is the closest to the I/O controller 101-1 traps the packet and transfers the packet to the management processor 116-1 using the particular bus 118-1. When the management processor 116-1 receives the packet, it transfers the received packet to the physical PCI-PCI bridge 113-1 correlated with the virtual PCI-PCI bridge 232-1 with a destination of the packet changed as shown in FIG. 10. When the management processor 116-1 receives a response packet from the physical PCI-PCI bridge 113-1, the management processor 116-1 returns the response packet to the I/O controller 101-1 via the trapper module 114-1.

Figure 14:
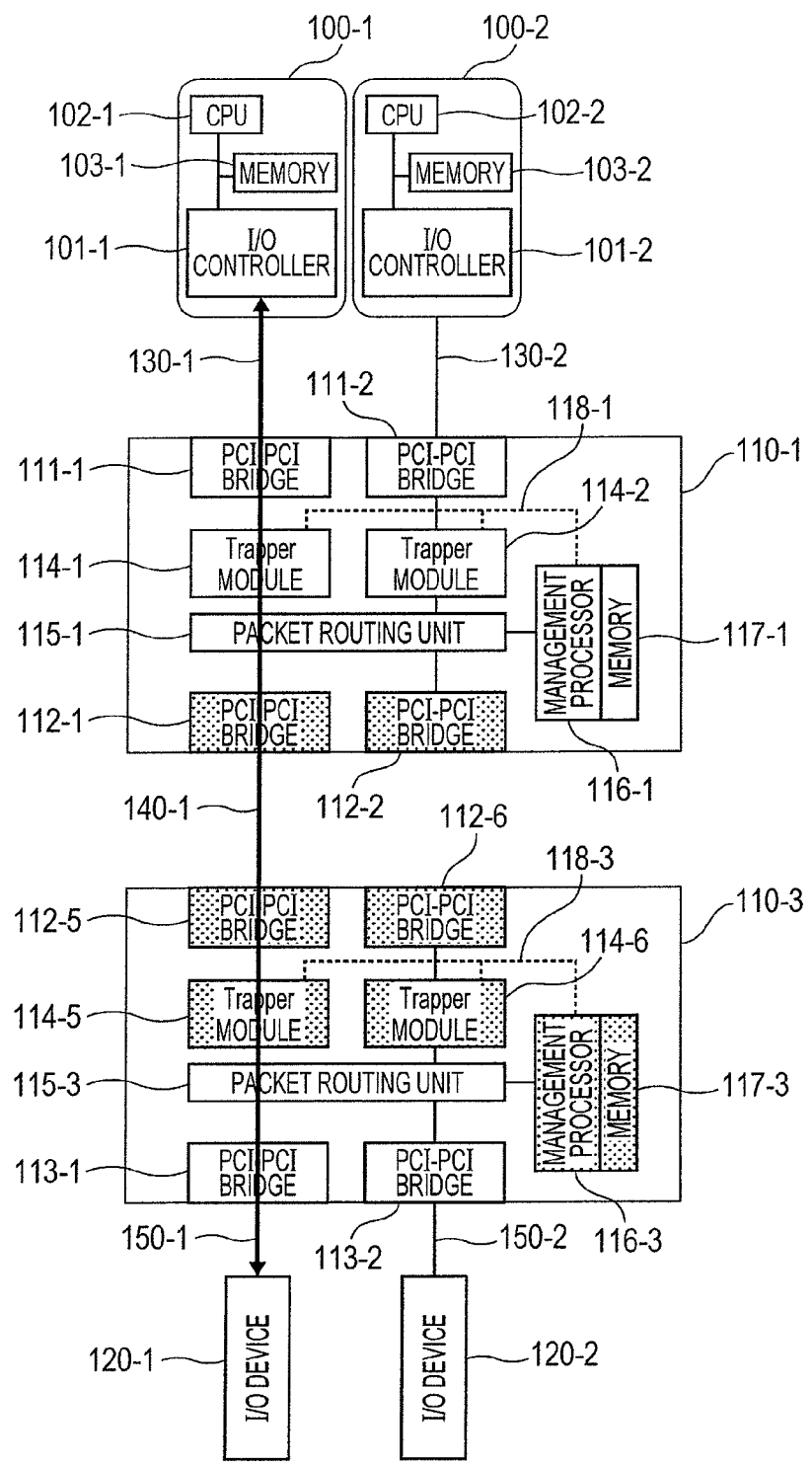
FIG. 14 A flow of a packet when access from the I/O controller to an I/O device occurs in one embodiment.

FIG. 14 shows a flow of a packet in the computer system when access from the I/O controller 101-1 to the I/O device 240-1 in the virtual PCIe topology occurs in the virtual PCIe topology shown in FIG. 2. In this case, the trapper module 114-1 traps no packet. Direct access is made from the I/O controller 101-1 to the I/O device 120-1 in the physical configuration correlated with the I/O device 240-1 in the virtual PCIe topology.

The preferred embodiment of the present invention has been described; however, the present invention is not limited to the embodiment, and further, the present invention may be variously modified.

For example, in the above-mentioned embodiment, each function of the trapper module 114 is validated when the PCIe switch 110 is connected to the I/O controller 101, in the meantime, when the PCIe switch 110 is not connected to the I/O controller 101, the functions of the trapper modules 114-5 to 114-8 in the PCIe switches 110-3, 110-4 are nullified, and all packets are passed. This is based upon a premise that all the PCIe switches 110 configured by a semiconductor integrated circuit have the same configuration including the trapper module. If a PCIe switch (a first PCIe switch) connected to the I/O controller 101 and a PCIe switch (a second PCIe switch) not connected to the I/O controller 101 can be configured by separate semiconductor integrated circuits, a function of the first PCIe switch provided with the trapper module can be ordinarily effectively utilized. In the meantime, since the function of the trapper module is nullified in the second PCIe switch, the second PCIe switch can be configured as the semiconductor integrated circuit provided with no trapper module at a first stage.

Further, in the embodiment, to inhibit an increase of the capacity of the memory 117 and an increase of the load of the management processor 116 in the address space of the virtual PCI-PCI bridge in the memory 117, the virtual PCI-PCI bridge and the physical PCI-PCI bridge are possibly correlated by one to one. However, it is also possible to adopt another example that if the capacity of the memory 117 is sufficient and the load of the management processor 116 is also allowable, the address space of all the virtual PCI-PCI bridges is secured in the memory. When the memory has the address space of all the virtual PCI-PCI bridges, processing of whether the virtual PCI-PCI bridge and the physical PCI-PCI bridge are correlated by one to one (S803 in FIG. 8) is not required, and the management processor can process all received packets.

As described above, according to the preferred embodiment of the present invention, the virtual PCIe topology that does not depend upon physical connection can be realized. Therefore, the PCIM can flexibly allocate a bus number to the PCIe link connected to the I/O device. Even if the multistage PCIe switches are connected to the I/O controller and the I/O device is connected to the PCIe switch at the last stage, the problem that the number of the connectable I/O devices decreases can be solved. Further, the I/O controller can access all the virtual PCI-PCI bridges and all the I/O devices.

LIST OF REFERENCE SIGNS

100: Computer 101: I/O controller 102: CPU 103: Memory 110: PCIe switch 111 to 113: Physical PCI-PCI bridge 114: Trapper module 115: Packet routing unit 116: Management processor 117: Memory 118: Particular bus 120: I/O device 130 to 150: PCIe link 220: Virtual PCIe switch 221 to 222: Virtual PCI-PCI bridge 230: Virtual PCIe switch 231 to 232: Virtual PCI-PCI bridge 240: I/O device 250 to 290: Virtual PCIe link 301: PCIe packet receiver 302: Packet destination comparing unit 303: Buffer 304: Input-output unit from/to management processor 305: PCIe packet transmitter 400: Packet 401: Destination of packet

The invention claimed is:

1. A computer system that transfers packet data, comprising:
   one or more computers:
   one or more I/O devices;
   one or more switches communicatively connected to the one or more computers and the one or more I/O devices, wherein the one or more switches each include:
   a first physical PCI-PCI bridge communicatively coupled to at least one of the one or more computers,
   a second physical PCI-PCI bridge communicatively coupled to at least one of the one or more I/O devices,
   a trapper unit configured to:
   determine a destination of packet data from the one or more computers and
   selectively trap packet data input to the switch and send the selectively trapped packet data to a management processor,
   a packet routing unit that transfers the packet data to the at least one of the one or more I/O devices; and
   the management processor connected to the trapper unit that includes one or more virtual PCI-PCI bridges and a virtual link to the one or more computers;
   wherein the management processor is configured to:
   store a one to one correlation of an address space of the physical PCI-PCI bridges and an address space of the virtual PCI-PCI bridges;
   store the address space of the one or more virtual PCI-PCI bridges that cannot be one to one correlated with one of the physical PCI-PCI bridges in a memory,
   determine whether the destination of the packet data is a virtual PCI-PCI bridge that is correlated with the physical PCI-PCI bridge,
   transfer, if the destination of the packet is a virtual PCI-PCI bridge is correlated to a physical PCI-PCI bridge, the packet data to a correlated physical PCI-PCI bridge; and
   acquire and transmit a response from the memory, if the destination of the packet is a virtual PCI-PCI bridge is not correlated to a physical PCI-PCI bridge;
   wherein the trapper unit is configured to selectively trap packet data if
   the destination of the packet data is determined to be the virtual PCI-PCI bridge.

2. The computer system according to claim 1, wherein the one or more switches are a semiconductor switch provided with the management processor and the memory, and the memory holds address space of the virtual PCI-PCI bridge.

3. The computer system according to claim 1, wherein the management processor is a processor of the computer system.

4. The computer system according to claim 1, wherein the trapper unit further includes:

a PCIe packet receiver that receives packet data transmitted from the one or more computers;

a comparing unit that stores a range of addresses which the physical PCI-PCI bridges use, a bus number and a device number, compares them with the destination of the packet data and judges a determination whether the packet data is to be trapped or not;

a buffer that temporarily stores the packet data transferred to the management processor;

an input-output unit that transfers the packet data to the management processor; and a PCIe packet transmitter that transmits packet data whose destination transferred from the management processor is an I/O controller as a result of the determination made by the comparing unit.

5. The computer system according to claim 1, wherein the one or more computers can recognize virtual PCIe topology provided by the management processor; and the virtual PCIe topology includes the virtual PCI-PCI bridge as a PCI-PCI bridge that connects PCIe switches and a virtual PCIe link that connects the one or more computers and one or more PCIe switches and connects the one or more PCIe switches and the one or more I/O devices.

6. The computer system according to claim 5, wherein a bus number given to the one or more I/O devices is changed by changing the correlation between the virtual PCI-PCI bridge and the physical PCI-PCI bridge.

7. A PCIe switch which is connected to a computer and an I/O device and which transfers packet data, comprising:

a first physical PCI-PCI bridge communicatively connected to the computer and a second physical PCI-PCI bridge, wherein the second physical PCI-PCI bridge is communicatively connected to the I/O device;

a trapper unit that traps packet data input to the switch;

a packet routing unit that transfers the packet data to the I/O device; and a management processor communicatively connected to the trapper unit that is configured to:

provide a virtual PCI-PCI bridge and a virtual link to the computer;

correlate an address space of the physical PCI-PCI bridges and the virtual PCI-PCI bridge;

secure in memory the address space of the virtual PCI-PCI bridge that cannot be correlated with physical PCI-PCI bridges, determine whether a destination of the packet data is a virtual PCI-PCI bridge that is correlated with a physical PCI-PCI bridge, transfer, if the destination is correlated with a virtual PCI-PCI bridge, the packet data to the physical PCI-PCI bridge correlated with the virtual PCI-PCI bridge, acquire a response from the memory and transmits the response to the trapper unit, if the destination is not correlated with a virtual PCI-PCI bridge;

wherein the trapper unit is configured to:

determine the destination of the packet data transferred from the computer;

pass the packet to the I/O device via the packet routing unit and the second physical PCI-PCI bridge, when the destination of the data packet is the I/O device;

trap the packet data and transmit the packet data to the management processor, when the destination of the data packet is the virtual PCI-PCI bridge.

8. The PCIe switch according to claim 7, wherein the switch further includes a memory that holds address space of the virtual PCI-PCI bridge, and the management processor accesses the address space of the virtual PCI-PCI bridge in the memory, acquires a response from the memory if necessary, and transmits the response to the trapper unit.

9. The PCIe switch according to claim 8, further comprising:

a virtual PCIe topology that includes a virtual PCI-PCI bridge as a PCI-PCI bridge that connects one or more PCIe switches and one or more virtual PCIe link that connects the computer and the one or more PCIe switches and connects the one or more PCIe switches and the one or more I/O devices.

10. The PCIe switch according to claim 7, wherein the trapper unit further includes:

a PCIe packet receiver that receives packet data transmitted from the computer;

a comparing unit that stores a range of addresses which the first PCI-PCI bridge and the second PCI-PCI bridge use, a bus number and a device number, compares them with the destination of packet data, and judges a determination whether the packet data is to be trapped or not;

a buffer that temporarily stores the packet data transferred between the buffer and the management processor;

an input-output unit that transfers packet data from/to the management processor; and a PCIe packet transmitter that transmits packet data whose destination transferred from the management processor is an I/O controller as a result of the determination made by the comparing unit.

11. A packet transfer control system for controlling the transfer of packet data, comprising:

one or more PCIe switches communicatively connected to a computer and communicatively connected to one or more I/O devices, a trapper module configured to:

determine a destination of the packet data;

trap the packet data and transfer the packet data to a management processor if the destination of the packet data is a virtual PCI-PCI bridge;

transfer the packet data to the I/O device without trapping it, if the destination of the packet data is the I/O device;

the management processor configured to:

determine the destination of the packet data is a virtual PCI-PCI bridge that is correlated with a physical PCI-PCI bridge;

transfer the packet data to the physical PCI-PCI bridge that is correlated to the virtual PCI-PCI bridge, when the destination of the packet is a virtual PCI-PCI bridge that is correlated with a physical PCI-PCI bridge; and acquire a response from a memory and transmits the response to the trapper module, when the destination of the packet data is a virtual PCI-PCI bridge that is not correlated with a virtual PCI-PCI bridge.

12. A packet transfer control method comprising:

preparing one or more virtual PCI-PCI bridges and one or more virtual links in a memory connected to a management processor that manages the PCI-PCI bridges;

receiving packet data transferred from a computer via a first physical PCI-PCI bridge communicatively connected to the computer by a PCIe switch;

determining a destination of the packet data by a trapper unit of the PCIe switch;

transferring the packet data to an I/O device via a second physical PCI-PCI bridge that is communicatively connected to one or more I/O devices when the destination of the packet data is the I/O device;

trapping the packet data and transmitting the packet data to the management processor when the destination of the packet data is the virtual PCI-PCI bridge correlating by one to one an address space for the one or more virtual PCI-PCI bridges and the first and second physical PCI-PCI bridges;

securing in memory the address space for the virtual PCI-PCI bridges that cannot be correlated to the physical PCI-PCI bridges;

acquiring a response from the memory, and transmitting the response to the trapper unit; and transmitting the packet data to the computer via the first physical PCI-PCI bridge.

13. The packet transfer control method according to claim 12, wherein a bus number given to the I/O device is changed by changing a correlation between one or more virtual PCI-PCI bridges and one or more physical PCI-PCI bridges.

* * * * *